United States Patent [19]
Palmadesso et al.

[11] Patent Number: 6,038,344
[45] Date of Patent: *Mar. 14, 2000

[54] INTELLIGENT HYPERSENSOR PROCESSING SYSTEM (IHPS)

[75] Inventors: Peter J. Palmadesso, Montclair, Va.; John A. Antoniades, Fulton, Md.

[73] Assignee: The United States of America as represented by the Secretary of the Navy, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/679,085

[22] Filed: Jul. 12, 1996

[51] Int. Cl.$^7$ .................................................. G06K 9/00
[52] U.S. Cl. ............................................................ 382/191
[58] Field of Search ................................... 382/100, 155, 382/156, 159, 204, 225, 228, 249, 325, 191

[56] References Cited

U.S. PATENT DOCUMENTS

| | | | |
|---|---|---|---|
| 5,329,595 | 7/1994 | Davies | 382/17 |
| 5,384,860 | 1/1995 | Gardemal et al. | 382/1 |
| 5,400,265 | 3/1995 | Kauppinen | 364/576 |
| 5,424,959 | 6/1995 | Reyes et al. | 364/498 |
| 5,479,255 | 12/1995 | Denny et al. | 356/319 |
| 5,481,476 | 1/1996 | Windig | 364/498 |
| 5,491,487 | 2/1996 | Gerlach | 342/378 |

OTHER PUBLICATIONS

Smith et al, "A New Approach to Quantifying Abundances of Materials . . . " Feb. 1994 pp. 2372–2374.
Chakraborty et al, "Multichannel Time–Varying ARMA Model Identification . . . " Jul. 1991 pp. 3229–3232.
Carlotto "Non–Linear Mixture model and Application for Enhanced Resolution . . . " Feb. 1995 pp. 1168–1170.
Zavaljevski et al, "Adaptive hyperspectral Small–target Detection" 1996 abstract only.

*Primary Examiner*—Christopher S. Kelley
*Attorney, Agent, or Firm*—Barry A. Edelberg; Edward F. Miles

[57] ABSTRACT

The Intelligent Hypersensor Processing System (IHPS) is a system for the rapid detection of small, weak, or hidden objects, substances, or patterns embedded in complex backgrounds. providing fast adaptive processing for demixing and recognizing patterns or signatures in data provided by certain types of "hypersensors". This system represents an alternative to prior systems for hidden object detection by solving the problems encountered when attempting to detect hidden objects/targets in dynamic scenarios at real-time.

IHPS accomplishes this by forming, a series of pattern vectors through the concatenation of the outputs of multiple sensors. Each sensor measures a different attribute of the system being observed, and has a consistent relationship to all the other sensors. The data stream form the sensors is entered into a processing system which employs a parallel-pipeline architecture. The data stream is simultaneously sent to two separate processor pipes. The first is the Demixer Module, which decomposes each pattern vector into a convex combination of a set of fundamental patterns which are the constituents of the mixture. The decomposition is accomplished using projection operations called 'Filter Vectors' generated by the Adaptive Learning Module. The signature pattern of a weak constituent or unresolved small target is separated from background patterns which may hide the target pattern in the unmixed data. A prior knowledge about the signatures of known targets can be used and approximate signatures of unknown constituents are determined automatically. Information detailing the composition of the demixed data patterns is sent to the Display/Output Module along with information about the fundamental patterns and Filter Vectors.

24 Claims, 7 Drawing Sheets

INTELLIGENT HYPERSENSOR PROCESSING SYSTEM (IHPS)

BACKGROUND OF THE INVENTION

The present invention relates generally to processing signals from data provided from certain types of sensors, and more particularly to a system for the rapid detection of small, weak or hidden objects, substances, or patterns embedded in complex backgrounds, by providing a fast, adaptive processing system for demixing and recognizing patterns or signatures in data provided by certain types of "hypersensors" in real time. A hypersensor is a sensor which produces as its output a high dimensional vector or matrix consisting of many separate elements, each of which is a measurement of a different attribute of the system or scene under construction. A hyperspectral imager is an example of a hypersensor. Hypersensors based on acoustic or other types of signals, or combinations of different types of input signals are also possible.

Historically there have been three types of approaches to the problems relating to the detection of small, weak or hidden objects, substances or patterns embedded in complex backgrounds.

The first approach has been to use low dimensional sensor systems which attempt to detect a clean signature of a well known target in some small, carefully chosen subset of all possible attributes, e.g., one or a few spectral bands. These systems generally have difficulty when the target signature is heavily mixed in with other signals, so they typically can detect subpixel targets or minority chemical constituents of a mixture only under ideal conditions, if at all. The target generally must fill at least one pixel, or be dominant in some other sense as in some hyperspectral bands. Also, the optimal choice of bands may vary with the observing conditions or background (e.g. weather and lighting). so such systems work best in stable, predictable environments. These systems are simpler than the high dimensional sensors (hypersensors), but they also tend to be less sensitive to subdominant targets and less adaptable.

The second approach has been to employ high dimensional sensor systems which seek to detect well known (prespecified) targets in complex backgrounds by using Principle Components Analysis (PCA) or similar linear methods to construct a representation of the background. Orthogonal projection methods are then used to separate the target from the background. This approach has several disadvantages. The methods used to characterize the background are typically not 'real time algorithms'; they are relatively slow, and must operate on the entire data set at once, and hence are better suited to post-processing than real time operation. The background characterization can get confused if the target is present in a statistically significant measure when the background is being studied, causing the process to fail. Also, the appearance of the target signature may vary with the environmental conditions: this must be accounted for in advance, and it is generally very difficult to do. Finally, these PCA methods are not well suited for detecting and describing unanticipated targets, (objects or substances which have not been prespecified in detail, but which may be important) because the representation of the background constructed by these methods mix the properties of the actual scene constituents in an unphysical and unpredictable way.

The more recent approach, is based on conventional convex set methods, which attempt to address the 'endmember' problem. The endmembers are a set of basis signatures from which every observed spectra in the dataset can be composed in the form of a convex combination, i.e., a weighted sum with non-negative coefficients. The non-negativity condition insures that the sum can sensibly be interpreted as a mixture of spectra, which cannot contain negative fractions of any ingredient. Thus every data vector is, to within some error tolerance, a mixture of endmembers. If the endmembers are properly constructed, they represent approximations to the signature patterns of the actual constituents of the scene being observed. Orthogonal projection techniques are used to demix each data vector into its constituent endmembers. These techniques are conceptually the most powerful of the previous approaches, but current methods for implementing the convex set ideas are slow, (not real time methods) and cannot handle high dimensional pattern spaces. This last problem is a serious limitation, and renders these methods unsuitable for detecting weak targets, since every constituent of a scene which is more dominant than the target must be accounted for in the endmember set, making weak target problems high dimensional. In addition, current convex set methods give priority to the constituents of the scene which are dominant in terms of frequency of occurrence, with a tendency to ignore signature patterns which are clearly above the noise but infrequent in the data set. This makes them unsuitable for detecting strong but small targets unless the target patterns are fully prespecified in advance.

SUMMARY OF THE INVENTION

Accordingly, it is an object of this invention to provide a system for the detection of weak or hidden objects or substances embedded in complex backgrounds.

Another object of this invention is to provide a system for the accurate and fast detection of hidden objects or substances embedded in complex backgrounds via the use of optical sensors.

Another object of this invention is to provide a system for the accurate and fast detection of hidden objects, substances or patterns embedded in complex backgrounds via the use of acoustic or other types of hypersensors.

Another object of this invention is to provide an efficient system for signal processing capable of handling multi dimensional analysis.

Another object of this invention is to provide a set of fast algorithms for signal processing which provide a greatly reduced computational burden in comparison to existing methods.

Another object of this invention is to provide a system for processing signals from hypersensors which offers true real time operation in a dynamic scenario.

A further object of this invention to provide a system for the detecting of weak or hidden objects or substances embedded in complex backgrounds which offers an adaptive learning capability.

These and additional objects of this invention are accomplished by the structures and processes hereinafter described.

The Intelligent Hypersensor Processing System (IHPS) comprises sensors, a demixer module, an adaptive learning module and a means for display. II IPS forms a series of pattern vectors through the concatenation of the outputs of multiple sensors. lioach sensor measures a different attribute of the system being observed, and has a consistent relationship to all the other sensors. The data stream from the sensors is entered into a processing system which employs a parallel-pipeline architecture. The data stream is simultaneously sent to two separate processor pipes. The first is the Demixer Module. which decomposes each pattern vector into a convex combination of a set of fundamental patterns which are the constituents of the mixture. The decomposition is accomplished using projection operations called 'Filter Vectors' generated in the second pipeline by the Adaptive Learning Module. The signature pattern of a weak constituent or an unresolved small target is separated from background patterns which may hide the target pattern in the unmixed data. A priori knowledge about the signatures of known targets can be used and approximate signatures of unknown constituents are determined automatically. Information detailing the composition of the demixed data patterns is sent to the Display/Output Module along with information about the fundamental patterns and Filter Vectors.

DETAILED DESCRIPTION OF THE PREFERRED EMBODIMENT

Figure 1:
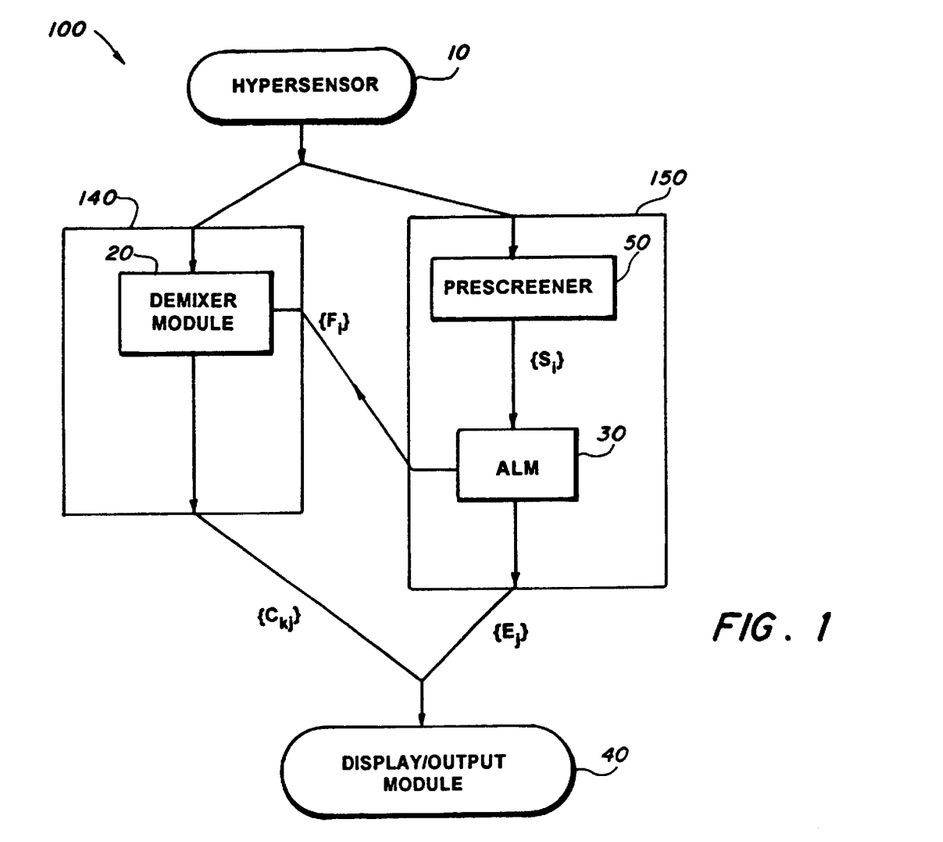
FIG. 1. is a block diagram of the preferred embodiment showing the system's parallel structure.

Referring now to the Figures, wherein like reference characters indicate like elements throughout the several views, FIG. 1 illustrates a block diagram of the basic architecture of the intelligent hypersensor processing system 100. A detailed description of the processing system 100 as it would operate if coupled to a hyperspectral imager (an optical hypersensor) 10 is as follows. For other types of hypersensors, the spectral vectors produced by the optical system would be replaced by a vectors of other types of data elements, such as the amplitudes of different frequencies of sound. The organization of input data vectors may also vary somewhat depending on the type of sensor. Aside from these sensor-dependent variations in the type and organization of the input data, the operation, capabilities, and output of the processing system would remain the same.

Figure 2:
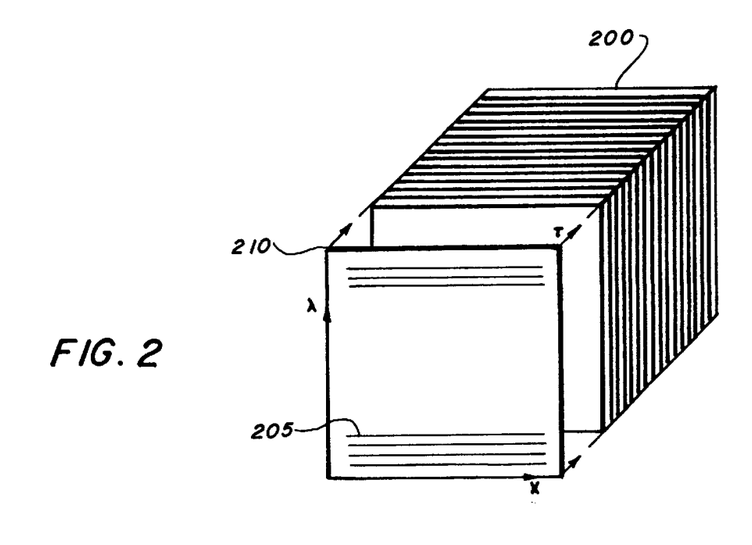
FIG. 2. is a representation of the data cube and the orientation of the spatial and wavelength information in X, λ and T coordinates.

In a preferred embodiment the optical system is employed on an aircraft or spacecraft. As the craft flies over or in close proximity to an area of interest, Hypersensor 10 scans the scene or area of interest by taking successive snapshots of the scene below. Each snapshot constitutes a frame of spectral data. Referring now to FIG. 2, the spectral data is scanned frame by frame 210 and displayed as variations in intensity. In the optical example, a frame 210 is the diffracted image on a 2 dimensional focal plane of a narrow slit which accepts light from a narrow linear strip of the scene. Variations of the optical sensor layout are possible.

Each frame 210 comprises multiple lines 205; each line 205 being the spectral characteristic for a specific point in the scene which correlates to a specific coordinate of the area scanned. Each frame 210 is configured such that the spatial information is expressed along the X axis and wavelength information is contained in the Z direction. FIG. 2 illustrates a data cube 200, created by the concatenation of successive frames 210 (diffirent spatial strips) and represents the observed spectral data of the scene provided by the hypersensor. The observed spectral data, which is used to create data cube 200 is expressed in vector form, and processed one spatial pixel, i.e. one spectrum. at a time. lach pixel is fed into a preprocessor (not shown) which performs normalization and purges bad spectral data, bad spectral data being data corrupted or otherwise useless due to incomplete spectral information.

Referring back to FIG. 1, the vector data $\{d_k\}$ is then simultaneously fed into separate processor pipes. The parallel processing architecture illustrated in FIG. 1 is the preferred structure. However, this system, algorithms and hardware contained herein may be employed in a system with a traditional architecture. The first processor pipe 140 comprises demixer module 20 which decomposes each vector into a convex combination of a set of fundamental patterns, which are endmembers or constituents of the mixture. The decomposition is accomplished using projection operators called 'Filter Vectors' generated by the adaptive learning module 30.

The filter vectors $\{F_i\}$ are a set of optimal matched filters: they are the smallest vectors which will satisfy the condition:

$$F_i \cdot E_j = \delta_{ij}$$

where is $\delta_{ij}$ the Kronccker delta function ($\delta_{ij}$ equals 1 if i=j and 0 otherwise) and the vectors $\{E_j\}$ are the endmembers of the scene. Thus, since each data vector (spectrum) is a convex combination of endmembers plus a noise vector $N_k$.

$$d_k = \sum_{j=1}^{n} c_{kj} E_j + N_k \quad c_{kj} \geq 0$$

The dot product of $d_k$ with filter vector $F_J$ yields the coefficient of endmember $E_J$ in the sum, plus a small error due to noise.

$$F_J \cdot d_k = \sum_{j=1}^{n} c_{kj} F_J \cdot E_j + F_J \cdot N_k \approx c_{kJ}$$

This determines the contribution which endmember J makes to the spectrum $d_k$. The Filter vectors are found by solving the minimization problem (smallest magnitude) described above, subject to the constraint imposed by the orthogonality condition. The solution has the form $$\underline{F} = \underline{\underline{M}}^{-1} \underline{\underline{E}}$$

where the filter vectors are the rows of the matrix $\underline{\underline{F}}$, the endmembers (assumed to have unit magnitude) are the rows of the matrix $\underline{\underline{E}}$, and the matrix $\underline{\underline{M}}$ has the elements $M_{ij} = E_i \cdot E_j$.

Filter vectors allow the signature pattern of a weak constituent or unresolved small target to be separated from background patterns which may hide the target pattern in the spectral data. Filter vectors demix the spectrum by projecting out one endmember at a time. Information detailing the composition of the demixed data spectrum is sent to Display/Output module 40, along with the information about the fundamental spectra patterns, and filter vectors from adaptive learning module 30. Display/Output module 40, displays the distribution of the constituents of the scene, or transmits or stores the demixed data for later analysis.

Figure 3:
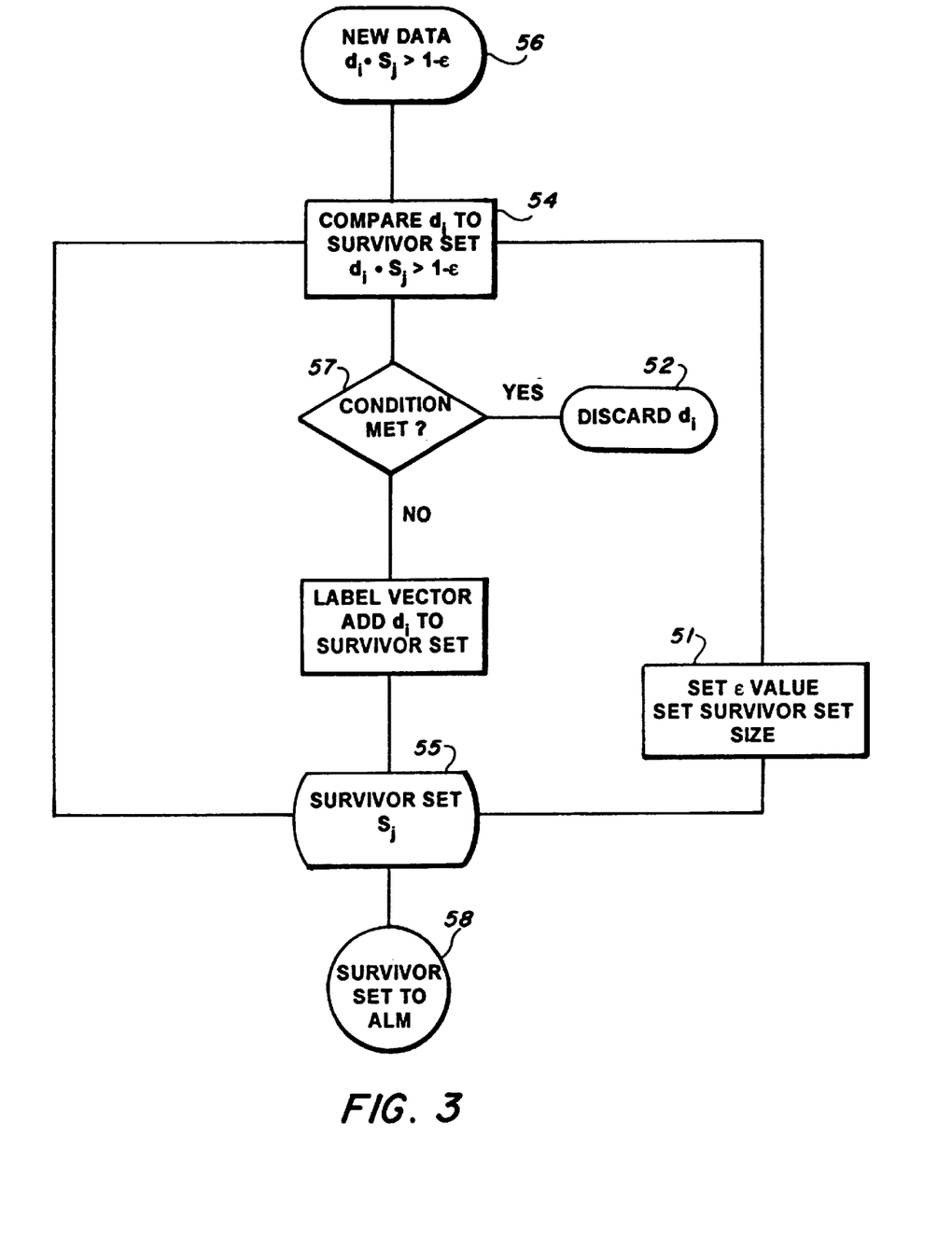
FIG. 3. is a logic flowchart of the operation of the prescreener

The second processor pipe 150 comprises prescreener 50, and adaptive learning module 30. Referring now to FIG. 3, prescreener 50 receives data vectors from preprocessor (not shown) and generates a reduced set of vectors called the vector survivor set or survivor set 55. Survivor set 55 is then transmitted to adaptive learning module 30. Prescreener 50 reduces the amount of data processed by discarding spectral signatures which have been seen before 57, 52 and therefore contain no new information. This reduces the computational burden on the other elements of the learning pipeline. iTIhe vector survivor set is generally about 1000 vectors in size however the size of the survivor set can vary depending upon the conditions and applications.

Prescreener 50 generates the survivor set by comparing 54 the data spectra of the most recent pixel sampled with existing members of the survivor set 55. The survivor set is generated by performing dot operations in accordance to the relation:

$$d_i \cdot S_j > 1 - \epsilon$$

where, $d_i$ is the newly sampled data, $S_j$ is an existing survivor set vector, and $\epsilon$ is variable controlling threshold sensitivity. Here, the vectors $d_i$ and $S_j$ are assumed to be normalized to unit magnitude. Thus, the condition $d_i \cdot S_j = 1$ means that the two vectors are identical and the condition $d_i \cdot S_j > 1 - \epsilon$ means that they are almost identical if $\epsilon$ is small. Vectors for $d_i$ which meet the above condition for any survivor $S_j$ are discarded 52 and the next vector is examined. Discarded vectors are not included in the survivor set. The value of $\epsilon$, which is set by the operator or a control system, is a function of the survivor set size desired, memory length for survivor set values, desired thruput of data and the noise in the signal 56. Generally, as the value of $\epsilon$ is increased, the sensitivity of the system is decreased. The survivor set vector, $S_j$, used for the above comparison is preferably chosen via the use of a structured search technique to minimize the number of dot operations while offering thorough analysis of the survivor set 55. This may be accomplished by comparing 54 the newly sampled data vector with the most recent vectors entered into the survivor set. Other search methods which minimize the number of operations necessary for thorough matching are also suitable.

FIG. 3 illustrates the flowchart of the logical operation of prescreener 50. The pruner 51 is a memory management device which determines when a survivor set vector should be purged from the memory. Pruner 51 monitors the survivor set 55, and adjusts the control parameters to control survivor set size. This is accomplished by setting the value for $\epsilon$ 54, and the maximum allowed age of a survivor, which determines the threshold for additions to the survivor set and the time a survivor is allowed to remain in the survivor set without being regenerated.

Also, referring to FIG. 1, the survivor set data, as computed by prescreener 50 is then input 58 into adaptive learning module 30. Learning module 30, computes from the survivor set, a set of endmembers $\{E_J\}$ which together span the current scene. Endmembers are a set of fundamental patterns (vectors) from which any pattern vector in the data set can be reconstructed as a convex combination in reduced dimensional space, to within an error determined by the noise or other error criteria. The requirement that all of the observed spectral vectors $d_k$ be representable as convex combinations of conventional basis vectors, insures that the decomposition makes sense as a physical mixture of constituents, since any such mixture must have this property. The resulting patterns conform as closely as possible to signatures of actual constituents of the scene.

Figure 8:
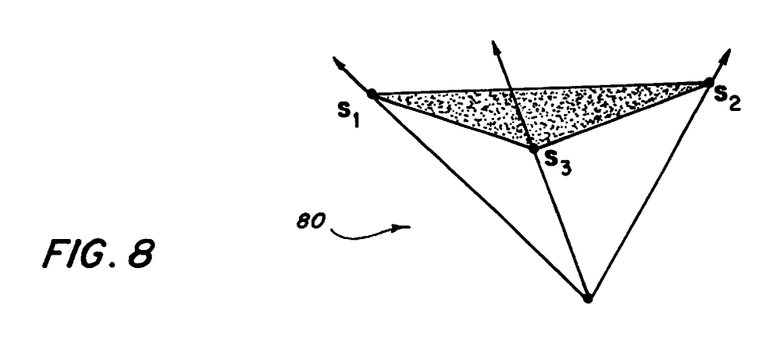
FIG. 8. is a representation of the 3-dimensional spanning space showing the salient vectors.
Figure 12:
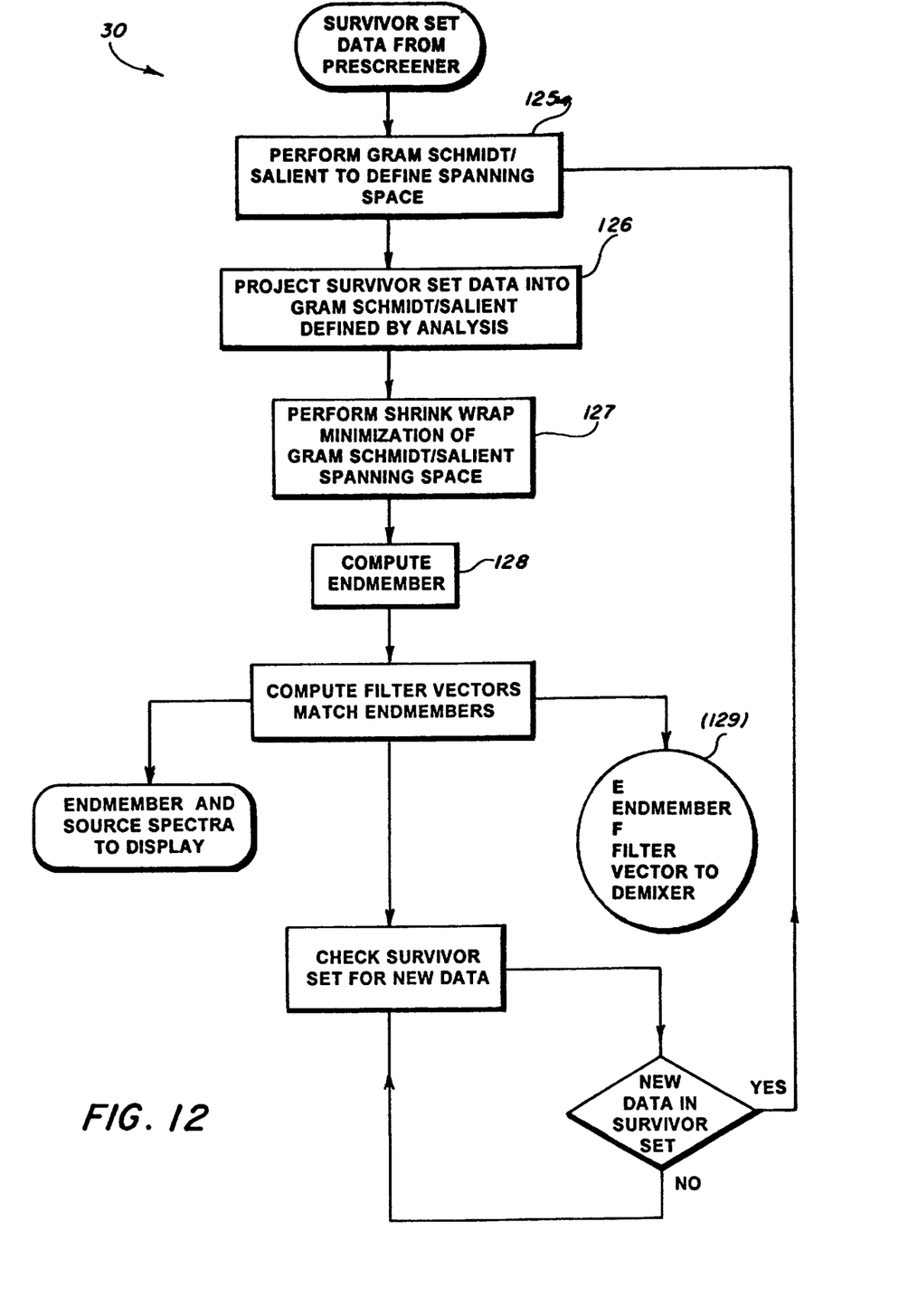
FIG. 12. is a logic flowchart of the operation of the adaptive learning module.

Referring now to FIG. 12, learning module 30, employs an ordered Gram-Schmidt analysis using salients to construct a reduced dimensional spanning space 125, while retaining the spectral information contained in the survivor set. The spanning space is constructed based on a spectral uniqueness hierarchy. The observed spectra of the survivor set, expressed as vector data are then projected into the spanning space 126. Computation of the endmembers is performed by Learning module 30 by projecting the survivor set data into a reduced dimensional spanning space using a Gram-Schmidt/Salient analysis of the survivor set data, and employing Shrink Wrap minimization 127 to minimize the spanning space volume defined using Gram-Schmidt/Salient analysis. The endmembers are defined 128 by the vertices of the hyper triangle defined by the minimized spanning space as illustrated in FIG. 8.

Gram-Schmidt/Salient Analysis

The spanning space is defined by using a Gram-Schmidt/Salient analysis of the survivor set vectors. In the parameter vector space which contains the survivor set data, one first determines the two vectors which are furthest apart in the space, then, in the plane formed by these two vectors, select two mutually orthogonal vectors which lie in the plane. These mutually orthogonal vectors are for convenience called basis vectors, for reasons made apparent below. Then select the vector in the data cube which is furthest from the plane and identify the hyperplane in which the basis vectors. and the newly selected vector, lie, and select a third basis vector such that it lies in the hyperplane and is mutually orthogonal to the other two basis vectors. One repeats this process. and accumulates more and more mutually orthogonal basis vectors, until the most distant remaining vector is found to be within a preselected distance of the hyperplane containing all the basis vectors. At this point, the survivor set vectors are projected onto the reduced dimensional space defined by these basis vectors. and further processing is done thereon. By reducing the dimension of the vector space in which one must work, one correspondingly reduces the number of operations one must do to perform any calculation. Because none of the data vectors lie very far outside the hypervolume spanned by the basis vectors, projecting the vectors into this subspace will change their magnitude or direction very little, i.e. projection merely sheds components of each vector which were small already. Furthermore, because such components are necessarily too small to correspond to significant image features, these components are disproportionately likely to be noise, and discarding them will increase the system's signal to noise ratio.

Figures 4, 5:
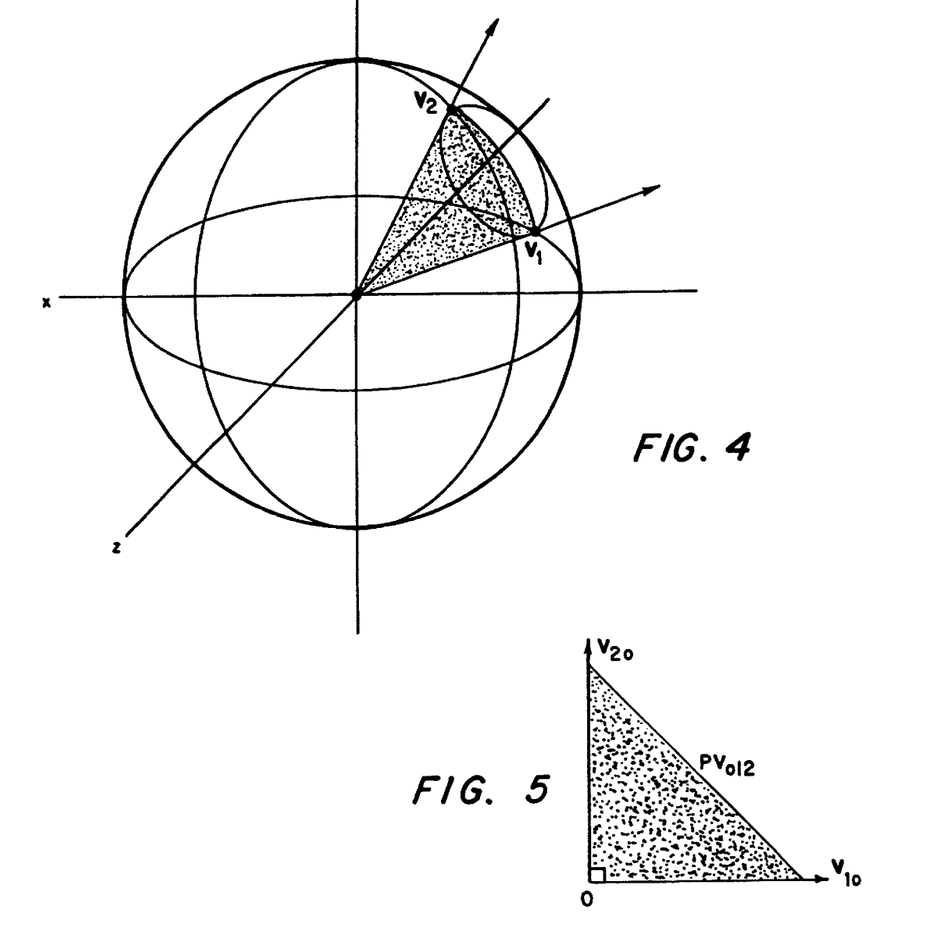
FIG. 4. is a representation of the plane created by $V_1$ and $V_2$ during Gram-Schmidt operations.
FIG. 5. is a representation of the orthogonal projections $V_{1o}$ and $V_{2o}$ during Gram-Schmidt operations.
Figure 6:
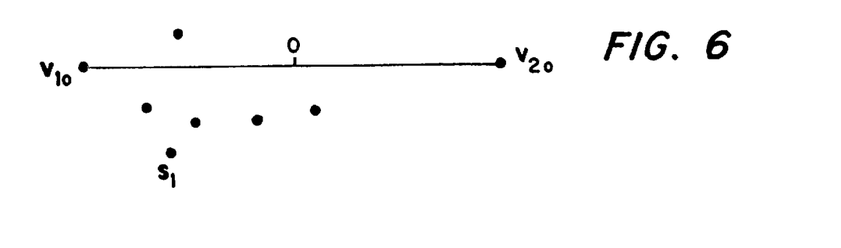
FIG. 6. is a representation of the Salient vector and plane defined by $V_{1o}$ and $V_{2o}$.
Figure 7:
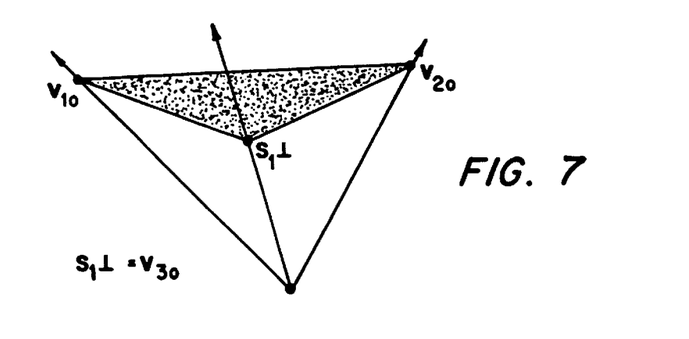
FIG. 7. is a representation of the 3-dimensional spanning space defined during Gram-Schmidt/Salient operations.

Gram-Schmidt\Salient analysis of the survivor set data is performed in accordance with the following algorithm:

a) Designate the two survivor vectors farthest apart, $V_1$ and $V_2$. FIG. 4 illustrates the orientation of $V_1$ and $V_2$ and the plane that $V_1$ and $V_2$ define.

b) Generate a 2 dimensional orthogonal set of basis vectors from $V_1$ and $V_2$ labeled $V_{1o}$ and $V_{2o}$ in the plane defined by $V_1$ and $V_2$, labeled as $PV_{o12}$ as illustrated in FIG. 5.

c) Determine the salient vector (vector displaced farthest from plane) in relation to plane $PV_{o12}$, defined in FIG. 6 as $S_1$.

d) The salient $S_1$ can be represented as a sum of vectors $S_1\perp$ and $S_{1\|}$, where $S_1\perp$ is orthogonal to the plane $PV_{o12}$ and $S_{1\|}$ lies in the plane. Use the Gram-Schmidt procedure to find $S_1\perp$, and call this $V_{3o}$. $V_{1o}$, $V_{2o}$ and $V_{3o}$ now define a subspace in 3 dimensions. See the FIG. 7. representation of the subspace created by this step.

e) Select the salient $S_2$ which is the survivor vector farthest from the subspace defined by step (d).

f) Generate a new orthogonal direction from $S_2$ defined as $V_{4o}$. $V_{4o}$ coupled with $V_{1o}$, $V_{2o}$, and $V_{3o}$ now defines a subspace of 4 dimensions.

g) Steps (e) and (f) are repeated to define a spanning space of N dimensions. The distance out of the current subspace of the salient selected at each step is the maximum residual error which would be incurred by projecting all of the survivors into the subspace.
This decreases at each stage, until the remaining error is within a specified error tolerance. At this point the subspace construction process is complete. The value of N is the number of dimensions necessary to allow the projection of the survivor set data vectors into the subspace while at the same time preserving important but infrequent signatures.

h) Project all of the survivor set data into the spanning space defined in steps (a)–(g).

Shrink Wrap

Once the N-dimensional spanning space is defined using the Gram-Schmidt\Salient analysis, a convex manifold in the form of a hypertriangle within the spanning space is generated using shrink wrap minimization. Shrink wrap minimization of the spanning space is a simple minimization operation, in which the volume of the manifold is reduced. while maintaining the condition that all of the data vectors projected into the reduced dimensional space via Gram-Schmidt\Salient operations are contained within the hypertriangle. The vertices of the hypertriangle are the endmembers, and the volume defined by the hypertriangle itself is the locus of all possible mixtures (convex combinations) of endmembers. The shrink wrap process determines good approximations of the physical constituents of the scene (endmembers), by insuring that the shape and orientation of the hypertriangle conforms as closely as possible to the actual distribution of the data vectors (survivors). The survivors are assumed to be mixtures of the actual constituents. The number of endmembers is equal to the dimension of the Gram-Schmidt/Salient spanning space.

Figure 9:
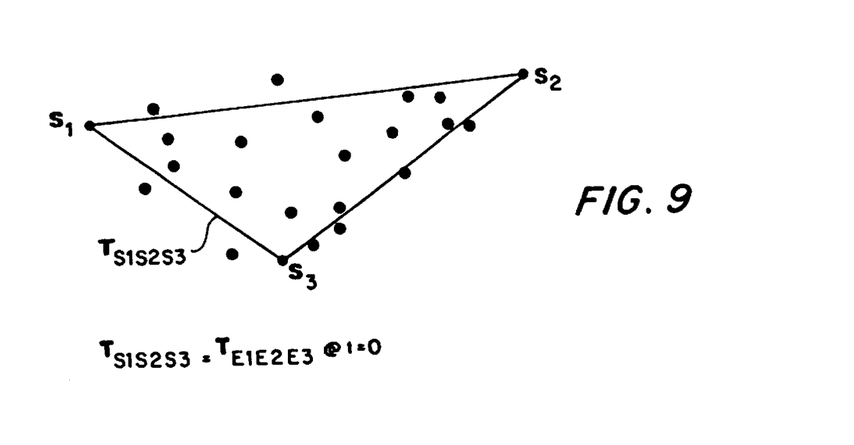
FIG. 9. is a representation of a hypertriangle convex manifold.

The salients are used to guide the shrink wrap process. Referring, to FIG. 8, hypertriangle $T_{S1S2S3}$ is defined by salient vectors. however, other vectors which include data may not be within the spanning space which $T_{S1S2S3}$ defines, as depicted in FIG. 9. The shrink wrap operation must satisfy the condition that all of the data vectors projected into the spanning space must be contained within the volume defined by convex manifold $T_{E1E2E3}$. The shrink wrap operation starts with $T_{E1E2E3}=T_{S1S2S3}$ and then expands or contracts the triangle $T_{E1E2E3}$ by manipulating the vertices, $E_1$, $E_2$ and $E_3$ or by manipulating the orientation of planes that define $T_{E1E2E3}$, by the minimal amount to fulfill the above stated condition.

For purposes of example, the method described above and the following methods have been found effective, however, any minimization method which maintains the condition that all of the data vectors be contained within the minimized space is suitable.

Adaptive learning module 30 generates a set of filter vectors $\{F_i\}$ and endmembers $\{E_1, E_2, E_3 \ldots E_N\}$ in accordance with one of the following procedures, or variants thereof:

Method 1

Figure 10A:
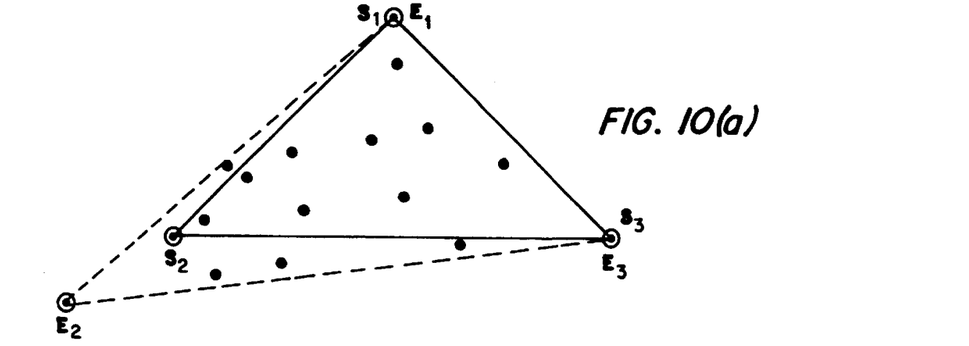
FIG. 10a. is a representation of a minimized hypertriangle defined using shrink wrap method 1.

With reference to FIG. 10a, find a set of endmembers $\{E_i\}$ such that each endmember $E_i$ is matched to a salient vector $S_i$, and is as close as possible to its salient, subject to the condition that all the data vectors are inside the hypertriangle with verticies $\{E_i\}$. I.e., minimize $$C = \sum_{i=1}^{N_D} (E_i - S_i)^2$$

subject to the constraints $F_i \cdot d_k \geq 0$ for all i and k. The filter vectors are computed from the candidate endmembers as described above. This constraint condition means that all the coefficients of the decomposition of $d_k$ into endmembers are non-negative, which is equivalent to saying that all $d_k$ are inside $T_{E1E2 \ldots EN}$. This is a nonlinear constrained optimization problem which can be solved approximately and quickly using various iterative constrained gradient methods.

Method 2

Figure 10B:
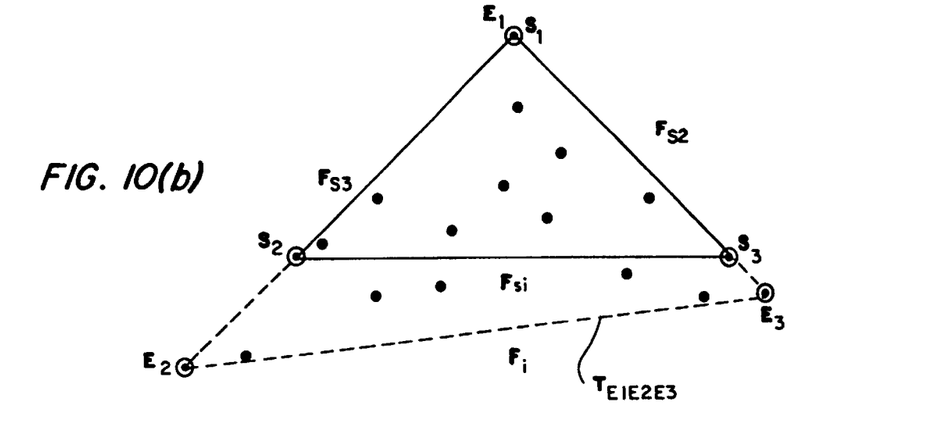
FIG. 10b. is a representation of a minimized hypertriangle defined using shirnk wrap method 2.

Compute a set of filter vectors $\{F_{si}\}$ from the salients $\{S_i\}$, using the formulas previously provided. These vectors will not, in general satisfy the shrink wrapping constraints see FIG. 10b. Find a new set of Filter vectors $\{F_i\}$ such that each Filter vector $F_i$ is matched to a salient Filter vector $F_{si}$, and is as close as possible to its salient filter, subject to the condition that all the data vectors are inside the hypertrian. I.e., minimize $$C=(F_i-F_{si})^2$$

subject to the constraints $F_i \cdot d_k \geq 0$ for all k. This is a set of independent quadratic programming problems with linear constraints, which can be solved in parallel using standard methods. The decoupling of the individual filter vector calculations increases computational efficiency. Manipulation of the Filter vectors instead of the endmember vectors is equivalent to manipulating the plane faces of the triangle instead of the vertices. Given solutions for the Filter vectors. find the endmembers using the same procedure used to compute Filter vectors from endmembers (the defining relationships are symmetric except for a normalization constant).

Method 3

Figure 11:
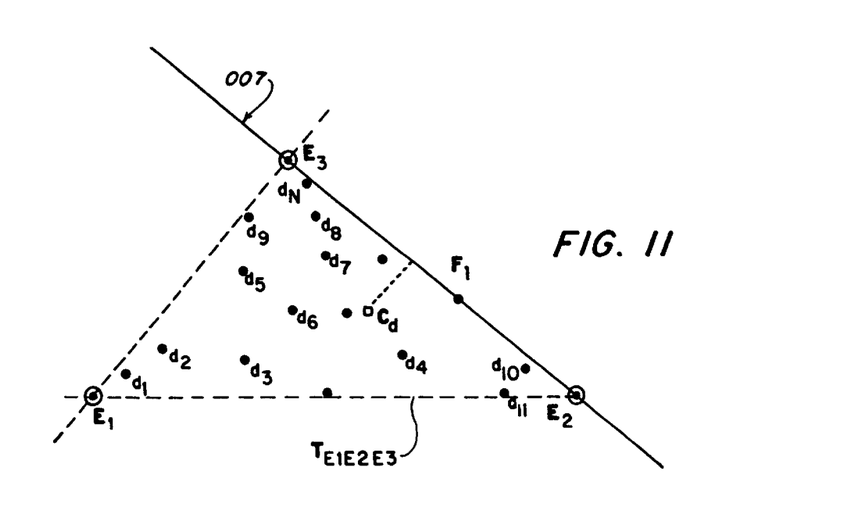
FIG. 11 is a representation of a minimized hypertriangle defined using shrink wrap method 3.

With reference to FIG. 11, find an approximate centroid $C_d$ of the set of survivor vectors, and then find the hyperplane of dimension one less than the dimension of the Gram-Schmidt/Salient space which is closest to the centroid.

Hyperplane 120 divides the complete subspace into two halves, and the minimization is subject to the constraint that all the survivor vectors $d_k$ must be in the same half-space as the centroid $\{C_d\}$. The normal to the optimal hyperplane 120, is $F_1$, the first filter vector. and the condition that all the survivors are in the same half- space is equivalent to the constraint that $F_1 \cdot d_k \geq 0$ for all k. This process is equivalent to finding a vector $F_1$ with a fixed magnitude which minimizes the dot product $F_1 \cdot C_d$ subject to the constraint $F_1 \cdot d_k \geq 0$ for all k. As such it is amenable to solution using conventional constrained optimization methods. The hypertriangle $T_{E1E2E3}$ can be constructed out of a set of suitably chosen optimal (locally minimal distance to the centroid) bounding hyperplanes which form the faces of the convex manifold. The normal to each face defines the associated filter vector. Again. the endmembers can be determined from the Filter vectors at the end of the shrink wrapping process.

Referring to FIG. 12, once the endmembers and filter vectors are computed adaptive learning module 30 stores this endmember and filter vector data, along with data reflecting the survivor set, and source vectors 33 for future recall. The adaptive learning module 30 then searches the survivor set for any changes. If the system detects change in the survivor set 99, the Gram-Schmidt and shrink wrap processes are repeated. This process allows the system to continually learn and adapt to changes in the environment. Endmember data and the accompanying survivor set and source data can be labeled as being consistent with a particular threat or target allowing the system to learn and remember the signature of specific targets in real time 34.

Again. referring to FIG. 1, the filter vectors and endmember data stream are transmitted from learning module 30, to demixer module 40, for computation of the endmember coefficients. The original data set from the sensor is also transmitted to demixer module 20 through the first processor pipe.

Demixer module 20 may contain several processors, each of which convolves the unprocessed data vector with a different filter vector. These operations could be performed sequentially on a single fast processor, but in the best mode they are performed in parallel. The output of demixer module 20, is a vector called the endmember coefficient vector, the jth element of which indicates the fraction of the jth fundamental pattern which is present in the unprocessed data vector. The endmember coefficients indicate the amplitude of the signal from the associated endmember, in a mixed spectrum.

Demixer module 20 convolves the unprocessed data vector and computes the endmember coefficient in accordance with the equation;

$$F_J \cdot d_k = \sum_{j=1}^{n} c_{jk} F_J \cdot E_j + F_J \cdot N_k \approx c_{Jk}$$

where $F_j$=said filter vector, $d_k$=said data set, $c_{jk}$=said endmember coefficient, $N_k$=noise vector and $E_j$=said endmember.

Figure 13:
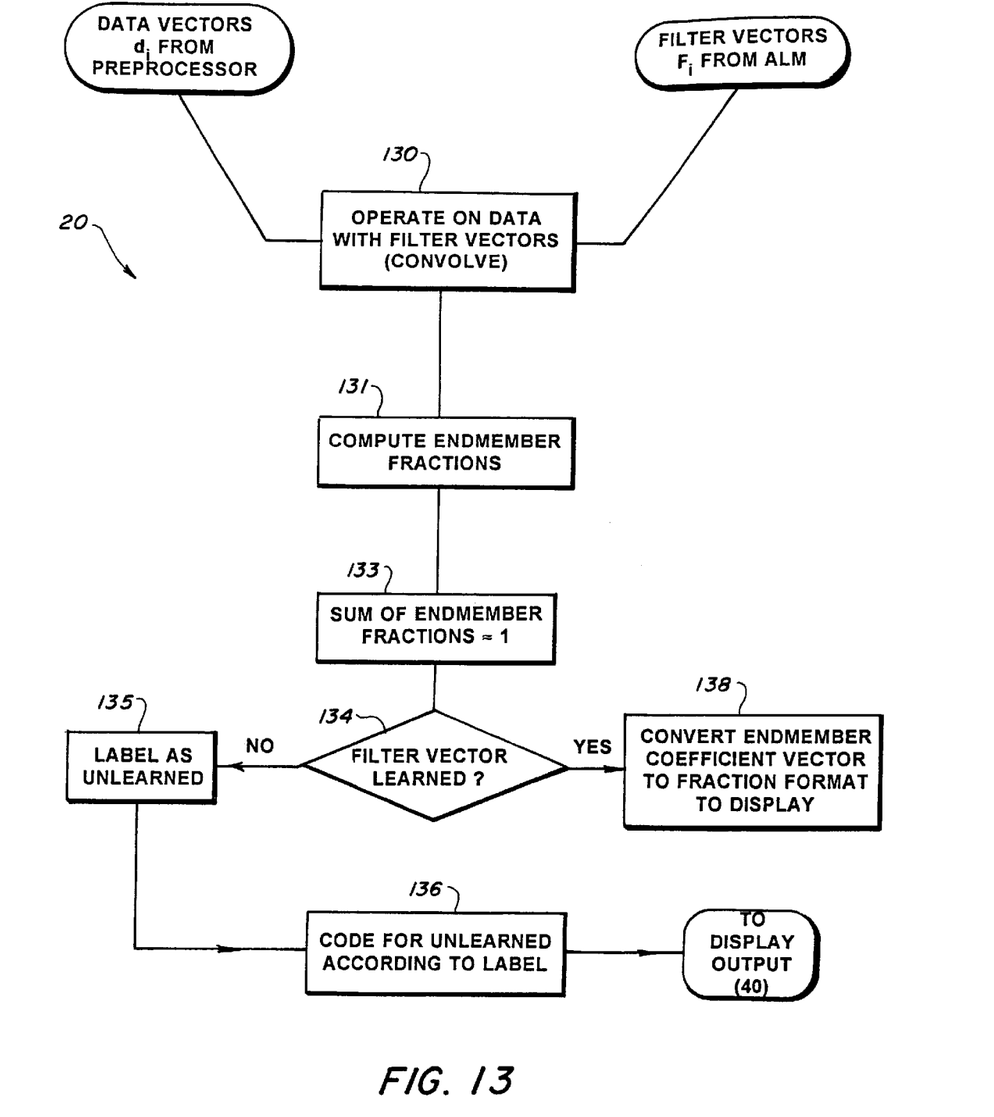
FIG. 13. is a flowchart of the operation of the demixer module.

Demixer module 20 next computes the fraction coefficient 131, which tells what percentage of the photons from the given pixel are associated with the endmember in accordance to the equation:

$$c_{jk\ fraction} = \frac{c_j(A(E))_j}{A(d_k)}$$

where $A(d_k)$ is the area under vector $d_k$, i.e. the sum of the elements of $d_k$.

FIG. 13 illustrates the flowchart for demixer module 20 operation including the demixer module's function in the system's learning process. If the pixel information passed from the preprocessor indicates bad data or an unlearned spectrum 133, 134 demixer module 20 routes that information to the display/ output module 40 with a notation of the status of the pixel data 135, 136.

The spectral information, filter vectors, endmember coefficients, and all is passed to the display/ output module 40 for display and further processing 138. The spectral characteristics of the data is displayed in terms of endmembers and endmember coefficients in maintaining to the relation:

$$d_k = \sum_{j=1}^{n} c_{kj} E_j + N_k$$

where $d_k$=said data set, $c_{kj}$=said endmember coefficient and c is $\geq 0$, $N_k$=noise and $E_j$=said endmember.

Obviously, many modifications and variations of the present invention are possible in light of the above teachings. For example this invention may be practiced without the use of a parallel processing architecture.

It is therefore understood that. within the scope of the appended claims. the invention may be practiced otherwise than as specifically described.

We claim:

1. A sensor system comprising:

means for collecting data;

a survivor set, said survivor set comprising survivor set members;

means for generating a data set, said data set comprising data set members wherein;

said means for generating compares said data set members with respective ones of said survivor set members effective to characterize said data set members as similar or dissimilar to said survivor set members according to a preselected criterion;

means for including said data set members characterized as dissimilar in said survivor set; and means for generating the endmember vectors of said survivor set.

2. A sensor system comprising:

a means for collecting data, a survivor set, said survivor set comprising survivor set members;

a means for generating a data set, said data set comprising data set members wherein;

said means for generating compares said data set members with respective ones of said survivor set members effective to characterize said data set members as similar or dissimilar to said survivor set members according to a preselected criterion, and a means for including said data set members characterized as similar in said survivor set;

a means for generating the endmember vectors of said survivor set;

a means for demixing said data set.

3. An optical sensor system comprising;
a means for collecting spectral data,
an adaptive learning module, said adaptive learning module computing endmember and source spectra by performing Gram-Schmidt/Salient analysis of said spectral data said analysis defining a reduced dimensional spanning space by:
 a) designating the two vectors contained in said data farthest apart
 b) generating an othogonal basis set in the plane defined by said two vectors;
 c) selecting the salient relating to said plane defined by said othogonal projection;
 d) generating a new othogonal basis set based on the salient selected in step c) said othogonal basis set defining a multi dimensional volume;
 continue steps (c)–(d) until the error falls within an acceptable range;
  said adaptive learning module further performing minimization of a convex manifold within said multi-dimensional volume subject to the condition that all vector information from said spectral data is contained within the minimized hypertriangle said endmembers being defined by the vertices of said minimized hypertriangle;
  said adaptive learning module computing said filter vectors in accordance with the equation:

$$F_i \cdot E_j = \delta_{ij}$$

subject to the condition that $\delta_{ij}=1$, if k=j and $\delta_{ij}=0$ otherwise, where $F_i$=said filter vector and $E_j$=said endmember,
a demixer module,
 said demixer module comprising a means to compute an endmember coefficient in accordance with the equation, $$F_k \cdot d_i = \sum_j c_{ij} F_k \cdot E_j + F_k \cdot N_i E_j = \sim c_{ik}$$

where $F_k$=said filter vector, $d_i$=said data set, $c_{ij}$=said endmember coefficient, $N_i$=noise and $E_j$=said endmember;
a means to further process and display the spectral characteristics of said data set in terms of said endmembers and endmember coefficients said processing in accordance with the equation $$d_i = \sum c_{ij} E_j + N_i$$

where $d_i$=said data set, $c_{ij}$=said endmember coefficient and is $\geq 0$, $N_i$=noise and $E_j$=said endmember.

4. An optical sensor system comprising;
a means for collecting optical spectral data,
a means for converting said optical data into a minimized set of data vectors comprising;
 a prescreener module, said prescreener module computing a survivor set of data vectors by screening data in accordance with the equation $$(d_i \cdot S_j > 1-\epsilon)$$

where $d_i$ represents a new data vector and $S_j$ represents a data vector from a survivor set;

an adaptive learning module
 said adaptive learning module computing endmember and source spectra by performing Gram-Schmidt/Salient analysis of said survivor set said analysis defining a reduced dimensional spanning space by:
 a) designating the two vectors contained in said survivor set farthest apart
 b) generating an othogonal basis set in the plane defined by said two survivor set vectors,
 c) selecting the salient relating to said plane defined by said othogonal basis set,
 d) generating a new othogonal basis set based on the salient selected in step (c) said othogonal basis set defining a multi dimensional volume;
 continue steps (c)–(d) until the error falls within an acceptable range,
  said adaptive learning module further performing minimization of a convex manifold within said multi-dimensional volume subject to the condition that all vector information from said survivor set is contained within the minimized hypertriangle said endmembers being defined by the vertices of said minimized hypertriangle,
  said adaptive learning module computing said filter vectors in accordance with the equation:

$$F_i \cdot E_j = \delta_{ij}$$

subject to the condition that $\delta_{ij}=1$, if k=j and $\delta_{ij}=0$ otherwise, where $F_i$=said filter vector and $E_j$=said endmember;
a demixer module;
 said demixer module comprising a means to compute an endmember coefficient in accordance with the equation;

$$F_k \cdot d_i = \sum_j c_{ij} F_k \cdot E_j + F_k \cdot N_i E_j = \sim c_{ik}$$

where $F_k$=said filter vector, $d_i$=said data set, $c_{ij}$=said endmember coefficient, $N_i$=noise and $E_j$=said endmember;
a means to further process and display the spectral characteristics of said data set in terms of said endmembers and endmember coefficients said processing in accordance with the equation $$d_i = \sum c_{ij} E_j + N_i$$

where $d_i$=said data set, $c_{ij}$=said endmember coefficient and is $\geq 0$, $N_i$=noise and $E_j$=said endmember.

5. A sensor system comprising;
a means for collecting spectral data,
an adaptive learning module, said adaptive learning module computing endmember and source spectra by performing Gram-Schmidt/Salient analysis of said spectral data said analysis defining a reduced dimensional spanning space by:
 a) designating the two vectors contained in said data farthest apart
 b) generating an othogonal basis set in the plane defined by said two vectors;
 c) selecting the salient relating to said plane defined by said othogonal projection;

d) generating a new othogonal basis set based on the salient selected in step (c) said othogonal basis set defining a multi dimensional volume;

continue steps (c)–(d) until the error falls within an acceptable range;

said adaptive learning module further performing minimization of a convex manifold within said multi-dimensional volume subject to the condition that all vector information from said spectral data is contained within the minimized hypertriangle said endmembers being defined by the vertices of said minimized hypertriangle;

said adaptive learning module computing said filter vectors in accordance with the equation:

$$F_i CE_j = d_{ij}$$

subject to the condition that $d_{ij}=1$, if $k=j$ and $d_{ij}=0$ otherwise, where $F_i$=said filter vector and $E_j$=said endmember, a demixer module, said demixer module comprising a means to compute an endmember coefficient in accordance with the equation, $$F_k Cd_i = jc_{ij} F_k CE_j + F_k CN_i E_j \approx c_{ik}$$

where $F_k$=said filter vector, $d_i$=said data set, $c_{ij}$=said endmember coefficient, $N_i$=noise and $E_j$=said endmember;

means to further process and display the spectral characteristics of said data set in terms of said endmembers and endmember coefficients said processing in accordance with the equation $$d_i = jc_{ij} E_j + N_i$$

where $d_i$=said data set, $c_{ij}$=said endmember coefficient and is $\geq 0$, $N_i$=noise and $E_j$=said endmember.

6. The system of claim 2 wherein said means for generating comprises:

a prescreener module, said prescreener module characterizing said data set members as similar or dissimilar to said survivor set members in accordance to the equation:

$$(d_i \cdot S_j > 1-e)$$

$d_i$ representing said data set member and $S_j$ representing said survivor set member and e representing a function of said system's sensitivity, wherein each of said data set members which fulfill said equation is characterized as dissimilar and included in said survivor set.

7. The system of claim 2 wherein said means for generating said endmember vectors comprises:

an adaptive learning module, said adaptive learning module computing endmember and source spectra.

8. The system of claim 7 wherein said adaptive learning module computes endmember and source spectra by performing a Gram-Schmidt/Salient analysis of said survivor set, defining a reduced dimensional spanning space and projecting said survivor set data into said reduced dimensional spanning space by:

a) designating the two vectors contained in said survivor set farthest apart b) generating an othogonal basis set in the plane defined by said two survivor set vectors;

c) selecting the salient relating to said plane defined by said othogonal basis set;

d) generating a new othogonal basis set based on said salient selected in step (c), said othogonal basis set defining a multi dimensional volume;

continuing steps (c)–(d) until the error falls within a desired range.

9. The system of claim 8 wherein said adaptive learning module further defines a optimized hypertriangle, by performing a shrink wrap minimization of an objective function designated to optimize the hypertriangle in the reduced dimensional spanning space, said shrink wrap minimization fulfilling to the condition that the vector information contained in said reduced dimensional spanning space is also contained within said optimized hypertriangle.

10. The system of claim 9 wherein said adaptive learning module computes said endmembers by defining said endmembers as the vertices of said optimized hypertriangle.

11. The system of claim 2 wherein the means for collecting data is a hypersensor.

12. The system of claim 2 wherein said means for generating the endmember vectors further comprises a means to compute filter vectors in accordance with the equation:

$$F_i \cdot E_j = \delta_{ij}$$

$F_i$ representing said filter vectors, $E_j$ representing said endmembers and $\delta=1$ if $i=j$, otherwise $\delta=0$.

13. The system of claim 2 wherein said means for demixing comprises a demixing module, said demixing module convolving said data set and computing endmember coefficients in accordance with the equation:

$$F_J \cdot d_k = \sum_{j=1}^{n} c_{jk} F_J \cdot E_J + F_J \cdot N_k \approx c_{Jk}$$

$F_j$ representing a filter vector, $d_k$ representing said data set, $c_{jk}$ said endmember coefficient, $N_k$ representing a noise vector and $E_j$ representing said endmember.

14. The system of claim 2 wherein said means for generating said survivor set employs a structured method which allows a minimum number of comparisons of said survivor set members to said data set information by eliminating redundant data in the data set.

15. The system of claim 2 said means for generating further said survivor set comprises a means for managing said survivor set size as a function of age of said survivor set members.

16. The system of claim 9 wherein said optimized hypertriangle is defined by using the filter vectors to perform shrink wrap minimization.

17. A sensor system comprising;

means for collecting spectral data, means for converting said data into a minimized sct of data vectors comprising;

a prescreener module, said prescreener module computing a survivor set of data vectors by screening data in accordance with the equation $$(d_i CS_j > 1-e)$$

where $d_i$ represents a new data vector and $S_j$ represents a data vector from a survivor set;

an adaptive learning module said adaptive learning module computing endmember and source spectra by performing Gram-Schmidt/Salient analysis of said survivor set said analysis defining a reduced dimensional spanning space by:
  a) designating the two vectors contained in said survivor set farthest apart
  b) generating an othogonal basis set in the plane defined by said two survivor set vectors;
  c) selecting the salient relating to said plane defined by said othogonal basis set;
  d) generating a new othogonal basis set based on the salient selected in step (c) said othogonal basis set defining a multi dimensional volume;
  continuing steps (c)–(d) until the error falls within an acceptable range,
said adaptive learning module further performing minimization of a convex manifold within said multi-dimensional volume subject to the condition that all vector information from said survivor set is contained within the minimized hypertriangle said endmembers being defined by the vertices of said minimized hypertriangle, said adaptive learning module computing said filter vectors in accordance with the equation:

$$F_i CE_j = d_{ij}$$

subject to the condition that $d_{ij}=1$, if k=j and $d_{ij}=0$ otherwise, where $F_i$=said filter vector and $E_j$=said endmember;
a demixer module;
  said demixer module comprising a means to compute an endmember coefficient in accordance with the equation;

$$F_k C d_i = j c_{ij} F_k C E_j + F_k C N_i E_j \approx c_{ik}$$

where $F_k$=said filter vector, $d_i$=said data set, $c_{ij}$=said endmember coefficient, $N_i$=noise and $E_j$=said endmember;
  means to further process and display the spectral characteristics of said data set in terms of said endmembers and endmember coefficients said processing in accordance with the equation $$d_i = j c_{ij} E_j + N_i$$

where $d_i$=said data set, $c_{ij}$=said endmember coefficient and is $\geq 0$, $N_i$=noise and $E_j$=said endmember.

18. A method for processing multi dimensional data which comprises:
  collecting data;
  constructing a survivor set, said survivor set comprising survivor set members;
  generating a data set, said data set comprising data set members;
  comparing said data set members with respective ones of said survivor set members;
  characterizing said data set members as similar or dissimilar to said survivor set members according to a preselected criterion;
  including said data set members characterized as dissimilar in said survivor set;
  generating endmember vectors of said survivor set;
  demixing said data set.

19. A method for processing multi dimensional data which comprises:
  collecting spectral data;
  computing endmember and source spectra by performing Gram-Schmidt/Salient analysis of said spectral data said analysis defining a reduced dimensional spanning space by;
    a) designating the two vectors contained in said data farthest apart;
    b) generating an orthogonal basis set in the plane defined by said two vectors;
    c) selecting the salient relating to said plane defined by said orthogonal projection;
    generating a new orthogonal basis set based on the salient selected in step (c) said orthogonal basis set defining a multi dimensional volume; continuing steps (c)–(d) until the error falls within an acceptable range;
  performing minimization of a convex manifold within said multi-dimensional volume subject to the condition that all vector information from said spectral data is contained within the minimized hypertriangle;
  defining said endmembers by the vertices of said minimized hypertriangle;
  computing said filter vectors in accordance with the equation:

$$F_i \cdot E_j = \delta_{ij}$$

subject to the condition that $\delta_{ij}=1$, if k=j and $\delta_{ij}=0$ otherwise, where $F_i$=said filter vector and $E_j$=said endmember;
  computing an endmember coefficient in accordance with the equation, $$F_k \cdot d_i = \Sigma c_{ij} F_k \cdot E_j + F_k \cdot N_i E_j \approx c_{ik}$$

where $F_k$=said filter vector, $d_i$=said data set, $c_{ij}$=said endmember coefficient, $N_i$=noise and $E_j$=said endmember;
  processing said endmembers and said endmember coefficients in accordance with the equation;

$$d_i = \Sigma c_{ij} E_j + N_i$$

where $d_i$=said data set, $c_{ij}$=said endmember coefficient and is $\geq 0$, $N_i$=noise and $E_j$=said endmember;
  displaying the spectral characteristics of said data set in terms of said endmembers and endmember coefficients.

20. The method of claim 18 wherein constructing said survivor further comprises:
  characterizing said data set members as similar or dissimilar to said survivor set members in accordance to the equation:

$$(d_i \cdot S_j > 1-e)$$

$d_i$ representing said data set member and $S_j$ representing said survivor set member and e representing a function of said system's sensitivity;
  wherein each of said data set members which fulfill said equation is characterized as dissimilar and included in said survivor set.

21. The method of claim 18 wherein generating said endmember vectors further comprises:
  computing endmember and source spectra.

22. The method of claim 18 wherein generating said survivor set further comprises:

employing a structured method which minimizes the number of comparisons of said survivor set members to said data set information by eliminating redundant data in the data set.

23. The method of claim 21 further comprising:

computing endmember and source spectra by performing a Gram-Schmidt/Salient analysis of said survivor set, defining a reduced dimensional spanning space and projecting said survivor set data into said reduced dimensional spanning space by:
 a) designating the two vectors contained in said survivor set farthest apart;
 b) generating an orthogonal basis set in the plane definitive by said two survivor set vectors;
 c) selecting the salient relating to said plane defined by said orthogonal basis set;
 d) generating a new orthogonal basis set based on said salient selected in step (c), said orthogonal basis set defining a multi dimensional volume;
 continuing steps (c)–(d) until the error falls within a desired range.

24. The method of claim 21 further comprising:

defining a optimized hypertriangle, by performing a shrink wrap minimization of an objective function designated to optimize the hypertriangle in the reduced dimensional spanning space, said shrink wrap minimization fulfilling to the condition that the vector information contained in said reduced dimensional spanning space is also contained within said optimized hypertriangle.

* * * * *